United States Patent
Ho et al.

(10) Patent No.: US 8,644,278 B2
(45) Date of Patent: Feb. 4, 2014

(54) SYSTEM AND METHOD FOR SIMULTANEOUS INFRASTRUCTURE AND AD HOC NETWORKED COMMUNICATIONS

(75) Inventors: Jin-Meng Ho, Plano, TX (US); Ariton E. Xhafa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 339 days.

(21) Appl. No.: 12/849,797

(22) Filed: Aug. 3, 2010

(65) Prior Publication Data
US 2012/0033652 A1 Feb. 9, 2012

(51) Int. Cl.
*H04W 4/00* (2009.01)
(52) U.S. Cl.
USPC ........................................................ 370/338
(58) Field of Classification Search
None
See application file for complete search history.

(56) References Cited

U.S. PATENT DOCUMENTS

| | | | |
|---|---|---|---|
| 2003/0133427 A1* | 7/2003 | Cimini et al. | 370/338 |
| 2005/0152305 A1* | 7/2005 | Ji et al. | 370/328 |
| 2007/0192832 A1* | 8/2007 | Qi et al. | 726/3 |
| 2008/0112351 A1* | 5/2008 | Surineni et al. | 370/312 |

* cited by examiner

*Primary Examiner* — Chi Pham
*Assistant Examiner* — Kouroush Mohebbi
(74) *Attorney, Agent, or Firm* — Steven A. Shaw; Wade James Brady, III; Frederick J. Telecky, Jr.

(57) ABSTRACT

Maintaining a simultaneous communication between a first wireless station and both an access point and a second wireless station includes the first wireless station gaining an instance of medium access by using applicable medium access protocols. Once the first wireless station gains an instance of medium access, it transmits frames to the access point on an infrastructure network and to the second wireless station on the same infrastructure network or an ad hoc network.

18 Claims, 1 Drawing Sheet

SYSTEM AND METHOD FOR SIMULTANEOUS INFRASTRUCTURE AND AD HOC NETWORKED COMMUNICATIONS

TECHNICAL FIELD

Embodiments of the invention are directed to enabling devices to communicate simultaneously on both infrastructure and ad hoc networks.

BACKGROUND

An infrastructure wireless network, such as one complying with the IEEE 802.11-2007 standard, typically comprises one or more stations communicating with an Access Point (AP). The AP transmits a beacon signal to identify itself to stations. A station associates with the AP in a Basic Service Set (BSS) which is also referred to as an infrastructure network. The stations use applicable medium access protocols, such as the distributed coordination function (DCF) based on Carrier Sense Multiple Access with Collision Avoidance (CSMA/CA), the Enhanced Distributed Channel Access (EDCA), and the Hybrid Coordination Function (HCF) Controlled Channel Access (HCCA), as specified in IEEE Std. 802.11-2007, to gain medium access. The stations receive contention parameters from the AP's beacon and apply those parameters to perform CSMA/CA for medium access. As part of HCCA, the AP may also provide polling access for stations.

In an ad hoc wireless network, as also specified in the IEEE 802.11 standards, the stations do not associate with an AP, but instead communicate directly with one another in an Independent Basic Service Set (IBSS) which is also referred to as an ad hoc network. The stations transmit beacons based on a simplified version of CSMA/CA, which allows itself and other stations to use CSMA/CA or EDCA to contend for medium access in the ad hoc network. The stations do not receive contention parameters in the beacons, but apply default contention parameters to perform CSMA/CA.

In known wireless networks, separate procedures for medium access are used for infrastructure and ad hoc networks. Stations are also subject to certain fundamental constraints. For example, a station cannot communicate simultaneously with an AP and another station, unless they all belong to an infrastructure network. Otherwise, a user needs to perform a manual configuration change to enable the station to communicate with the AP or with another station, one at a given time.

According to the IEEE Std. IEEE 802.11-2007, a station transmits when it gains medium access. The station gains medium access when its backoff counter reaches zero if the station uses the DCF, or when one of its access category backoff counters reaches zero if the station uses EDCA. The station also gains medium access if it is granted a polled transmission opportunity (TXOP) through HCCA. Moreover, if a station gains medium access by DCF, it transmits one frame only; if the station gains medium access by EDCA or HCCA, it transmits one or more frames to an AP or a peer station, but not both. The air time must not exceed the explicitly or implicitly specified TXOP duration. In a TXOP obtained for an access category through EDCA, the frames transmitted must also have at least the user priority mapped to that access category.

SUMMARY OF THE INVENTION

Embodiments of the invention enable concurrent wireless networking on both infrastructure and ad hoc networks. They allow a Wireless Local Area Network (WLAN) station to communicate directly with a peer WLAN station and an AP if need be, regardless of whether the stations are associated with the same AP, different APs, or no APs at all. This capability provides versatile and efficient networks and communications. The systems and methods described herein further enable ad hoc communications to achieve the same level of efficiency as infrastructure communications.

According to one embodiment of the present invention, a station gains medium access using applicable medium access protocols, such as the DCF, EDCA, and HCCA specified in the IEEE Std. IEEE 802.11-2007. When a station gains medium access by DCF, it transmits a frame to an AP or a peer station, which is not necessarily also associated with the AP. When a station gains medium access by EDCA or HCCA, it transmits one or more frames, sequentially, to an AP, a peer station which is not necessarily also associated with the AP, or the AP and the peer station alternately. The air time must not exceed the explicitly or implicitly specified TXOP duration. In a TXOP obtained for an access category through EDCA, the frames transmitted must also have at least the user priority mapped to that access category.

According to another embodiment of the present invention, if both communicating stations support Quality of Service (QoS) as defined in the IEEE Std. 802.11-2007, then QoS frames may be exchanged between them. All stations must respect the duration field in received frames regardless of whether the frame is received in an infrastructure or ad hoc network. The stations must obey the duration field without regard to the Basic Service Set IDentifier (BSSID) that is contained in the received frame.

In one embodiment, a first wireless station and both an access point and a second wireless station maintain simultaneous communications between each other. The first and second wireless stations are associated with the access point, or only one of the wireless stations, but not both, is associated with the access point. The first wireless station gains an instance of medium access by using applicable medium access protocols. Once the first wireless station gains an instance of medium access, it transmits frames to the access point on an infrastructure network and to the second wireless station on the same infrastructure network or an ad hoc network. The overall air time must not exceed the maximum air time allowed for the instance of medium access. All transmitted frames must have a user priority mapped to the access category for which the instance of medium access was obtained.

BRIEF DESCRIPTION OF THE DRAWINGS

Figure 1:
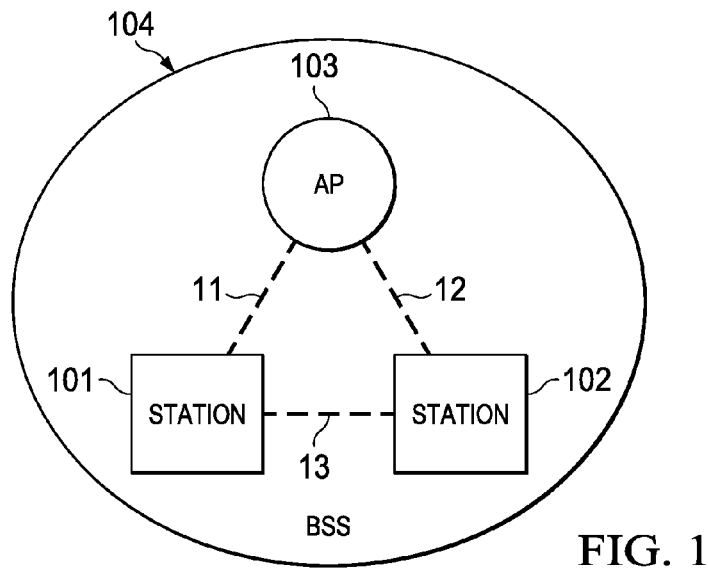
Figure 2:
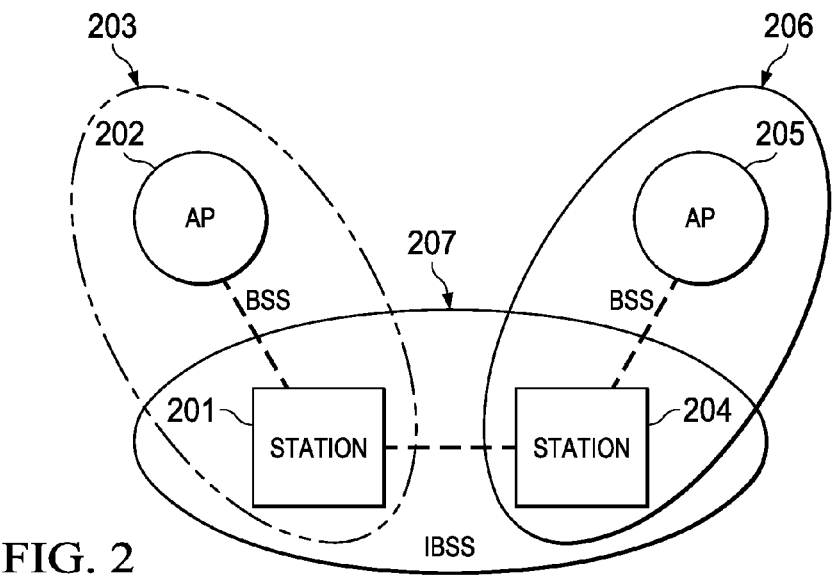
Figure 3:
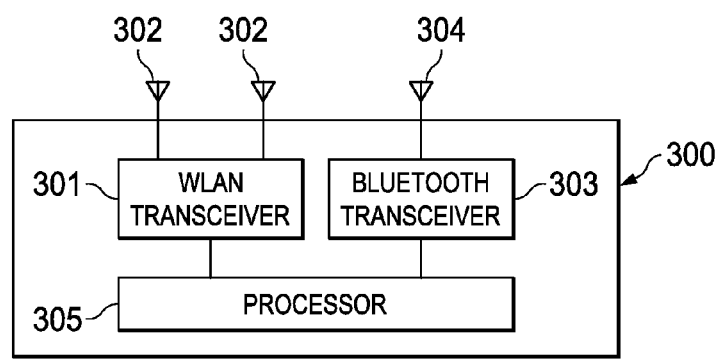

Having thus described the invention in general terms, reference will now be made to the accompanying drawings, wherein:

FIG. 1 illustrates stations associated with the same access point in an infrastructure network and connected with each other in an ad hoc network;

FIG. 2 illustrates stations associated with different access points in separate infrastructure networks and connected with each other in an ad hoc network; and FIG. 3 is a block diagram illustrating components of a WLAN station according to an exemplary embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIGS. 1 and 2 illustrate relationships between WLAN stations and APs in exemplary infrastructure and ad hoc networks. FIG. 1 illustrates stations 101/102 associated with the same access point 103 in an infrastructure network and connected with each other in an ad hoc network. Station 101 communicates with AP 103 via infrastructure network connection 11, and station 102 communicates with AP 103 via infrastructure network connection 12. Infrastructure connections 11 and 12 may be connections that are supported by the IEEE 802.11 protocols, for example. Stations 101 and 102 also communicate with each other via ad hoc network connection 13, which may be, for example, a connection supported by the Bluetooth protocols or an enhanced connection to the ad hoc connection supported by the IEEE 802.11 protocols.

Stations 101/102 and AP 103 communicate with one another using BSS-based medium access. Frame exchanges between stations 101 and 102 occur in BSS 104 since both stations are associated with the same AP. Ad hoc connection 13 may also be established between stations 101 and 102, for example, through co-located Bluetooth devices. Once the ad hoc connection 13 is established, the stations may start using DCF or EDCA to send frames directly to each other. The stations do not need to go through the direct link setup (DLS) procedure as specified in the IEEE Std. 802.112007 to communicate with each other via the ad hoc network. Stations 101 and 102 may use polling access provided by AP 103 to transmit frames directly to each other, for example, based on HCCA. If the AP allows for direct link, the stations may follow the DLS procedure described in the IEEE Std. 802.11-2007 in which the AP provides polled TXOPs to the stations.

In one embodiment, stations 101 and 102 exchange frames with AP 103 using BSS-based DCF, EDCA, or HCCA protocols. Stations 101 and 102 exchange frames with each other over the ad hoc network 13 using the Bluetooth's protocols or the WLAN' IBSS-based protocols.

In FIG. 2, station 201 is associated with AP 202 in BSS 203, and station 204 is associated with AP 205 in BSS 206. BSS 203 and 205 are supported by the IEEE 802.11 protocols. Stations 201 and 204 also communicate with each other via an ad hoc network in IBSS 207, which may be, for example, a connection supported by the Bluetooth protocols or an enhanced connection to the ad hoc connection supported by the IEEE 802.11 protocols. Because stations 201 and 204 are not associated with the same AP, frame exchanges between the two stations occur in IBSS 207 instead of a BSS. An ad hoc connection between these two stations may also be established, for example, through co-located Bluetooth devices. The stations then use DCF or EDCA to send frames directly to each other as described in the above.

Stations that are not associated with the same infrastructure network must be adapted to support unified BSS and IBSS access in order to communicate with each other and with an AP simultaneously. Two stations may communicate using EDCA or HCCA to transmit frames to each other, if both stations support QoS. However, HCCA may be used only if both stations are associated with the same AP which also supports QoS.

All stations must observe the duration and network allocation vector (NAV) rules as specified in the IEEE Std. 802.11-2007. In particular, unless they are required to send an immediate response, the stations respect the duration indicated in any received frame without regard to the BSSID or other address fields contained in the frame.

For a station using DCF, the station may transmit when the station's backoff counter has a value of zero. At that time, the station may transmit a frame to another station in an ad hoc network using a BSSID of an IBSS, or the station may transmit a frame addressed to an AP in an infrastructure BSS.

For a station using EDCA, the station may transmit when it obtains a TXOP for an access category (AC). At that time, the station may transmit frames to another station using the BSSID of an IBSS for an ad hoc network, the station may transmit frames to an AP in a BSS for an infrastructure network, or the station may transmit frames sequentially to the AP and the other station alternately. All of the transmitted frames must have at least the user priority mapped to the AC for which the TXOP was obtained, and must not exceed the TXOP limit in their overall air time. When EDCA is used, the backoff counters for the transmitting station are based on the EDCA Parameter Set information element that the station received from the associated AP. Alternatively, if the transmitting station is not associated with an AP on the channel over which the station communicates with a recipient station, then the backoff counters are based on default EDCA parameter values In one embodiment of the invention, a station may initiate frame exchanges in either an infrastructure network or an ad hoc network. For example, when the station's backoff counter has a value of zero or when the station obtains a TXOP, the station may first exchange frames with the AP in the BSS and then exchange frames with another station in the IBSS, or the station may first exchange frames with the other station in the IBSS and then exchange frames with the AP in the BSS. Alternatively, the station may interleave frame exchanges with the AP in the BSS and frame exchanges with the other station in the IBSS.

In one embodiment, the stations do not need to transmit announcement traffic indication message (ATIM) frames or support ATIM windows at the beginning of each beacon interval. The stations may coordinate their own power management and do not coordinate their sleep times with other stations.

In other embodiments, no stations in an ad hoc network may transmit beacons. The stations in the IBSS use data rates based on the rates broadcast in their beacons or, if no beacons are transmitted, the stations use the data rates exchanged or negotiated while the ad hoc connection was being established, for example, through a Bluetooth connection.

Upon receiving a create connection command or a similar instruction from a co-located host, such as a Bluetooth host, for example, the Station Management Entity (SME) of the station causes the Medium Access Control (MAC) Sublayer Management Entity (MAC/MLME) to perform an authentication and/or a four-way handshake with the MAC of a peer station identified in the command or instruction. The station in the source role as indicated in the connection command or similar instruction initiates the authentication and the four-way handshake procedure. The station not in the source role responds to the authentication and the four-way handshake procedure.

If both stations support counter mode with cipher block chaining message authentication code protocol (CCMP), then the stations use open system authentication. A Pairwise Master Key (PMK) provided in the connection command or a similar instruction is used as the PMK for a four-way handshake between the stations. The stations then use CCMP to protect frames exchanged between them. The PMK may be provided through another ad hoc network, such as a Bluetooth network. A first station and a second station use the PMK to accomplish a four-way handshake on the ad hoc network.

If both stations support Temporal Key Integrity Protocol (TKIP), but do not both support CCMP, then open system authentication is used. The PMK provided in the connection command or a similar instruction is used as the PMK for a four-way handshake between the stations. Then, the TKIP is used to protect frames exchanged between the two stations.

If both stations support Wired Equivalent Privacy (WEP)-104, but do not both support TKIP or CCMP, then the first 104 bits of the PMK provided in the connection command or a similar instruction is used as the WEP encryption key for WEP-104 protected frames exchanged between the stations. The stations use shared key authentication and no four-way handshake is performed between the stations.

If both stations support WEP-40, but do not both support any other cipher suite, then the first 40 bits of the PMK provided in the connection command or a similar instruction is used as the WEP encryption key for WEP-40 protected frames exchanged between the stations. The stations use shared key authentication, and no 4-way handshake between them is performed.

In one embodiment, an ad hoc connection may be deleted as follows. Upon receiving a delete connection command or a similar instruction, from a co-located host, such as a Bluetooth host, for example, the SME of the station causes the MAC/MLME to perform a deauthentication procedure with the MAC of a peer station identified in the command or instruction. Both stations purge the keying material relating to the ad hoc connection after deauthentication.

FIG. 3 is a block diagram schematically illustrating a wireless device 300 according to one embodiment. The term "device" as used herein has the same meaning as "station," and the terms are interchangeable. Device 300 comprises a WLAN transceiver 301 that transmits signals to, and receives signals from, other WLAN transceivers, such as in access points and stations in a WLAN complying with the IEEE 802.11 standards. WLAN transceiver 301 is coupled to one or more antennas 302 that are used to exchange radio frequency (RF) signals with other WLAN antennas, which may be, for example, WLAN stations or APs as specified in the IEEE 802.11 standards. Device 300 optionally further comprises another network transceiver 303, such as a Bluetooth transceiver, that transmits signals to, and receives signals from, other network transceivers in an ad hoc network. Network transceiver 303 is coupled to antenna 304 that exchanges RF signals with other network antennas. Device 300 further comprises processor 305, which controls transceivers 301 and 303 and provides data streams for transmission on either the infrastructure or ad hoc networks. Transceivers 301 and 303 provide received signals to processor 305 for decoding, decryption and other processing.

One of ordinary skill in the art will understand that device 300 may comprise other components to communicate with infrastructure and ad hoc networks as described herein. The components of device 300 may be embodied as individual circuits or separate components, or as a single device that performs more than one of the illustrated operations. For example, in one embodiment, the components may be a microprocessor, central processing unit (CPU), integrated circuit (I/C), or application specific integrated circuit (ASIC) with appropriate software, firmware, or other embedded instructions that control the operation of the transmitter and receivers and cause the components to perform the functions described herein.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for maintaining a simultaneous communication between a first wireless station and both an access point and a second wireless station, comprising:
    gaining an instance of medium access by the first wireless station using an applicable networking protocol; and
    transmitting, during the instance of medium access, one or more frames from the first wireless station to the access point and the second wireless station sequentially or alternately.

2. The method of claim 1, wherein the first wireless station, the second wireless station, and the access point all belong to a same infrastructure network or Basis Service Set (BSS).

3. The method of claim 1, wherein the first and second wireless stations do not both belong to a same infrastructure network or BSS but belong to an ad hoc network or Independent Basic Service Set (IBSS).

4. The method of claim 1, wherein
    the first and second wireless stations are Wireless Local Area Network (WLAN) stations, and the access point is a WLAN access point, the WLAN stations and WLAN access point each complying with an IEEE Standard 802.11-2007; and
    the first wireless station transmits frames to the access point using a Basic Service Set Identifier (BSS ID) of a BSS, and to the second wireless station using the BSS ID of the BSS if the two wireless stations both belong to the BSS or using a BSS ID of an IBSS if the two wireless stations both belong to the IBSS.

5. The method of claim 4, further comprising:
    if the instance of medium access was gained by using a Distributed Coordination Function (DCF) based Carrier Sense Multiple Access with Collision Avoidance (CSMA/CA) protocol, the first wireless station transmitting a frame to the access point or the second wireless station, but not both;
    if the instance of medium access was gained by using an Enhanced Distributed Channel Access (EDCA) protocol, the first wireless station transmitting one or more frames to the access point or the second wireless station, sequentially or alternately, wherein an air time for transmitting one or more frames and appropriate acknowledgment frames does not exceed a transmission opportunity (TXOP) limit applicable to the instance of medium access, and the one or more frames have at least a user priority mapped to an access category used to obtain the instance of medium access; and
    if the instance of medium access was gained by using a Hybrid Coordination Function (HCF) Controlled Channel Access (HCCA) protocol, the first wireless station transmitting one or more frames to the access point or the second wireless station, sequentially or alternately, wherein an air time for transmitting one or more frames and appropriate acknowledgment frames does not exceed a polled TXOP duration applicable to the instance of medium access.

6. The method of claim 1, further comprising:
using a Pairwise Master Key (PMK) provided through another ad hoc network to accomplish a four-way handshake between the first and second wireless stations on the ad hoc network; and
using a counter mode with cipher block chaining message authentication code protocol (CCMP) to protect frames exchanged between the first and second wireless stations on the ad hoc network.

7. The method of claim 1, further comprising:
using a Pairwise Master Key (PMK) provided through another ad hoc network to accomplish a four-way handshake between the first and second wireless stations on the ad hoc network; and
using a Temporal Key Integrity Protocol (TKIP) to protect frames exchanged between the first and second wireless stations on the ad hoc network.

8. The method of claim 1, further comprising:
using a first 104 bits of a Pairwise Master Key (PMK) provided through another ad hoc network as a Wired Equivalent Privacy (WEP) encryption key for WEP-104 protected frames exchanged between the first and second wireless stations on the ad hoc network.

9. The method of claim 1, further comprising:
using a first 40 bits of a Pairwise Master Key (PMK) provided through another ad hoc network as a Wired Equivalent Privacy (WEP) encryption key for WEP-40 protected frames exchanged between the first and second wireless stations on the ad hoc network.

10. A wireless network device, comprising:
a transceiver adapted to communicate with both an access point and a peer wireless network device; and
a processor coupled to the transceiver, the processor providing frames for transmission by the transceiver on either an infrastructure network or an ad hoc network, the transceiver gaining an instance of medium access by the wireless network device using an applicable networking protocol, and
transmitting, during the instance of medium access, one or more frames from the wireless network device to the access point and the peer wireless network device sequentially or alternately.

11. The device of claim 10, wherein the wireless network device, the peer wireless network device, and the access point all belong to a same infrastructure network or Basis Service Set (BSS).

12. The device of claim 10, wherein the wireless network device and the peer wireless network device do not both belong to a same infrastructure network or Basis Service Set (BSS) but belong to an ad hoc network or Independent Basic Service Set (IBSS).

13. The device of claim 10, wherein
the wireless network device and the peer wireless network device are Wireless Local Area Network (WLAN) stations, and the access point is a WLAN access point, the WLAN stations and WLAN access point each complying with an IEEE Standard 802.11-2007; and
the wireless network device transmits frames to the access point using a Basic Service Set Identifier (BSS ID) of a BSS, and to the peer wireless network device using the BSS ID of the BSS if the two wireless network devices belong to the BSS or using a BSS ID of an IBSS if the two wireless network devices belong to the IBSS.

14. The device of claim 13, wherein
if the instance of medium access was gained by using a Distributed Coordination Function (DCF) based Carrier Sense Multiple Access with Collision Avoidance (CSMA/CA) protocol, the wireless network device transmits a frame to the access point or the peer wireless network device, but not both;
if the instance of medium access was gained by using an Enhanced Distributed Channel Access (EDCA) protocol, the wireless network device transmits one or more frames to the access point or the peer wireless network device, sequentially or alternately, wherein an air time for transmitting one or more frames and appropriate acknowledgment frames does not exceed a transmission opportunity (TXOP) limit applicable to the instance of medium access, and the one or more frames have at least a user priority mapped to an access category used to obtain the instance of medium access; and
if the instance of medium access was gained by using a Hybrid Coordination Function (HCF) Controlled Channel Access (HCCA) protocol, the wireless network device transmits one or more frames to the access point or the peer wireless network device, sequentially or alternately, wherein an air time for transmitting one or more frames and appropriate acknowledgment frames does not exceed a polled TXOP duration applicable to the instance of medium access.

15. The device of claim 10, wherein
the processor uses a Pairwise Master Key (PMK) provided through another ad hoc network to accomplish a four-way handshake with the peer wireless network device on the ad hoc network; and
uses a counter mode with cipher block chaining message authentication code protocol (CCMP) to protect frames exchanged with the peer wireless network device on the ad hoc network.

16. The device of claim 10, wherein
the processor uses a Pairwise Master Key (PMK) provided through another ad hoc network to accomplish a four-way handshake with the peer wireless network device on the ad hoc network; and
uses a Temporal Key Integrity Protocol (TKIP) to protect frames exchanged with the peer wireless network device on the ad hoc network.

17. The device of claim 10, wherein
the processor uses a first 104 bits of a Pairwise Master Key (PMK) provided through another ad hoc network as a Wired Equivalent Privacy (WEP) encryption key for WEP-104 protected frames exchanged with the peer wireless network device on the ad hoc network.

18. The device of claim 10, wherein:
the processor uses a first 40 bits of a Pairwise Master Key (PMK) provided through another ad hoc network as a Wired Equivalent Privacy (WEP) encryption key for WEP-40 protected frames exchanged with the peer wireless network device on the ad hoc network.

* * * * *